US012688875B2

(12) United States Patent
Sugawara

(10) Patent No.: US 12,688,875 B2
(45) Date of Patent: Jul. 21, 2026

(54) COMMUNICATION APPARATUS, CONTROL METHOD FOR COMMUNICATION APPARATUS, AND STORAGE MEDIUM

(71) Applicant: CANON KABUSHIKI KAISHA, Tokyo (JP)

(72) Inventor: Azusa Sugawara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 171 days.

(21) Appl. No.: 18/433,036

(22) Filed: Feb. 5, 2024

(65) Prior Publication Data

US 2024/0265946 A1 Aug. 8, 2024

(30) Foreign Application Priority Data

Feb. 8, 2023 (JP) ................................. 2023-017828

(51) Int. Cl.
*G11B 20/10* (2006.01)
*G06F 3/16* (2006.01)
*H04R 1/08* (2006.01)

(52) U.S. Cl.
CPC ........ *G11B 20/10527* (2013.01); *G06F 3/165* (2013.01); *H04R 1/08* (2013.01); *G11B 2020/10851* (2013.01)

(58) Field of Classification Search
CPC .... G11B 20/10527; G11B 2020/10851; G06F 3/165
USPC .............................................. 381/77, 83, 85
See application file for complete search history.

(56) References Cited

U.S. PATENT DOCUMENTS

| | | | |
|---|---|---|---|
| 10,276,207 B1 | 4/2019 | Sanders | |
| 2006/0270465 A1 | 11/2006 | Lee | |
| 2009/0052685 A1* | 2/2009 | Cilia | H04R 1/083 |
| | | | 381/77 |
| 2012/0049998 A1* | 3/2012 | Lim | A61B 5/165 |
| | | | 340/1.1 |
| 2022/0210551 A1* | 6/2022 | Bayer | H04R 3/00 |

FOREIGN PATENT DOCUMENTS

| | | |
|---|---|---|
| EP | 2117223 A1 | 11/2009 |
| JP | 2015073170 A | 4/2015 |
| JP | 6108788 B2 | 4/2017 |

OTHER PUBLICATIONS

The above patent documents was cited in a European Search Report issued on Jul. 10, 2024, that issued in the corresponding European Patent Application No. 24155222.3.

* cited by examiner

*Primary Examiner* — Thjuan K Addy
(74) *Attorney, Agent, or Firm* — Cowan, Liebowitz & Latman, P.C.

(57) ABSTRACT

A communication apparatus including an audio capturing unit wirelessly communicate with an external apparatus and transmit captured audio data. The apparatus stores the captured audio data and control deletion of the store audio data according to a predetermined rule. In a case where a wireless communication state with the external apparatus relating to transmission of the captured audio data does not satisfy a predetermined condition, the apparatus performs control so that the stored audio data is not deleted according to the predetermined rule.

11 Claims, 8 Drawing Sheets

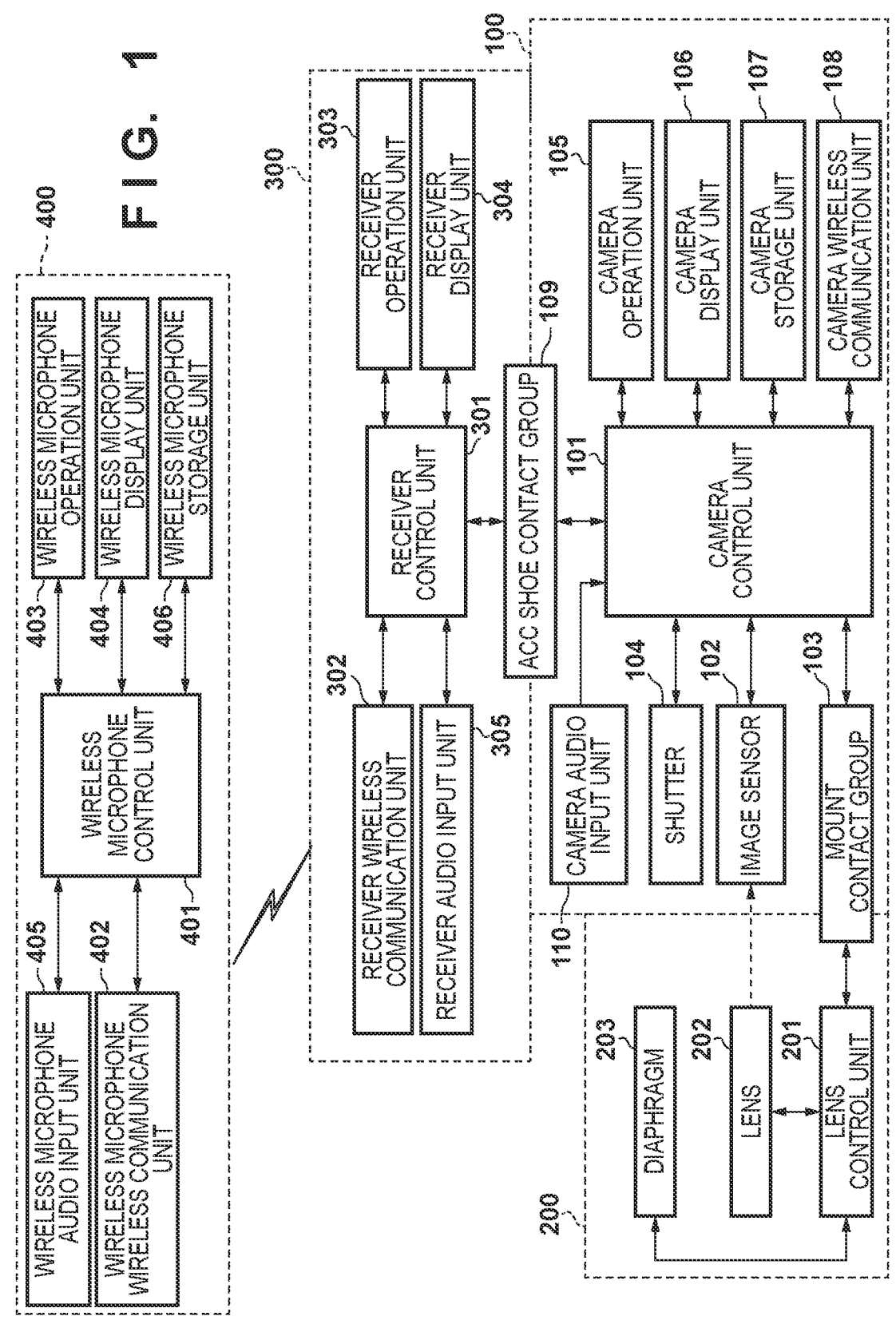
F I G. 1

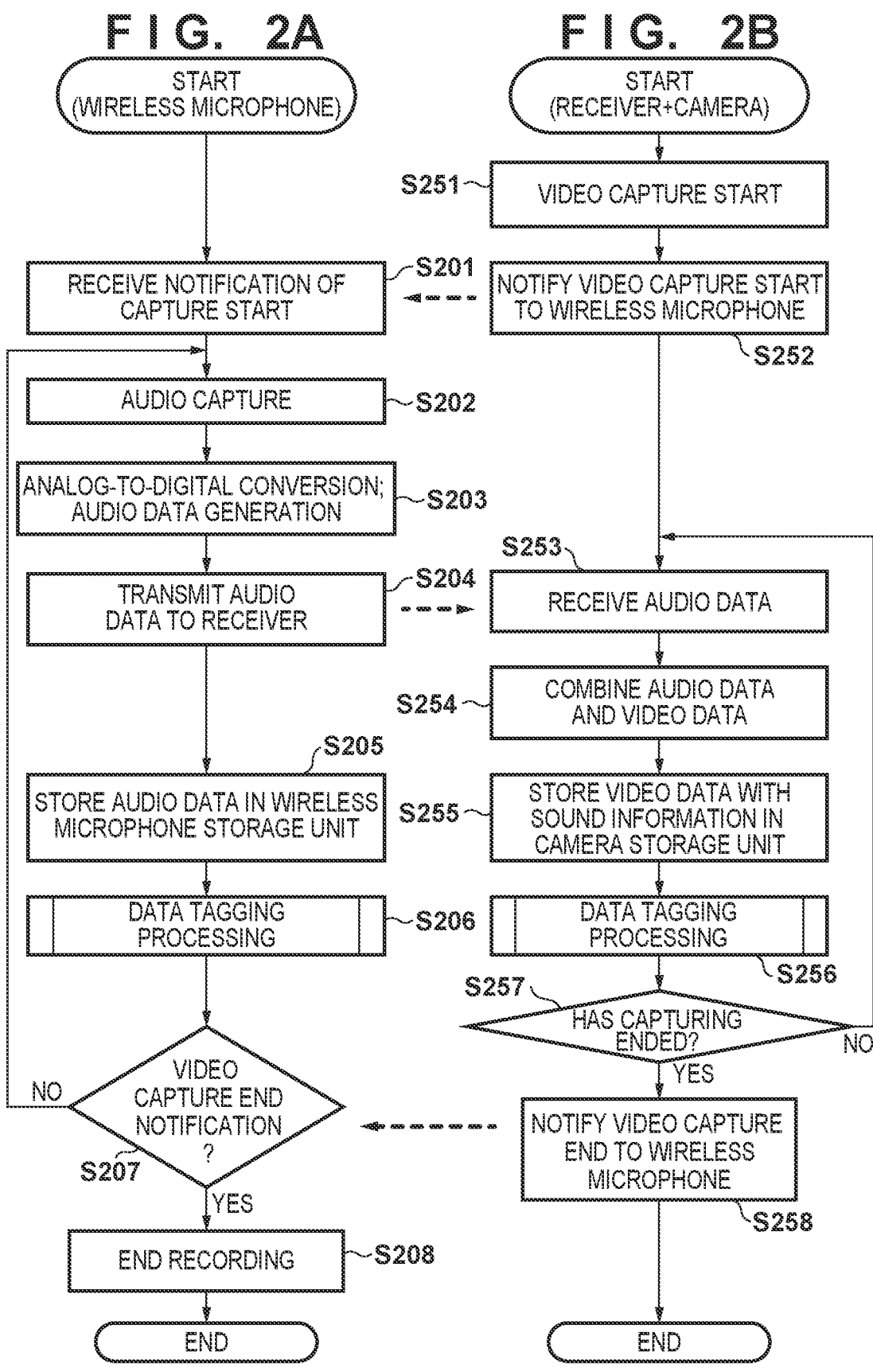
F I G. 2A
F I G. 2B

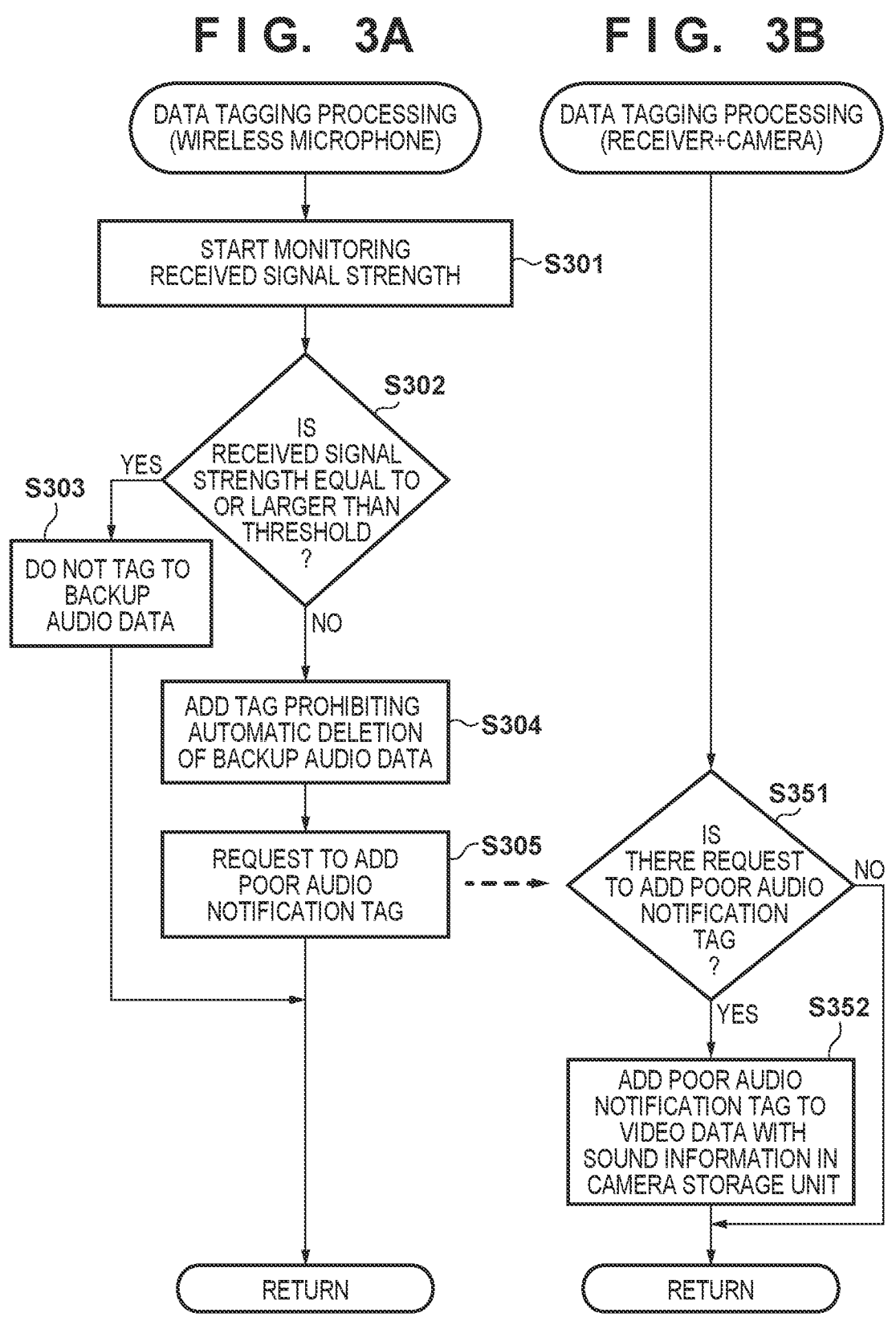
F I G.  3A
F I G.  3B

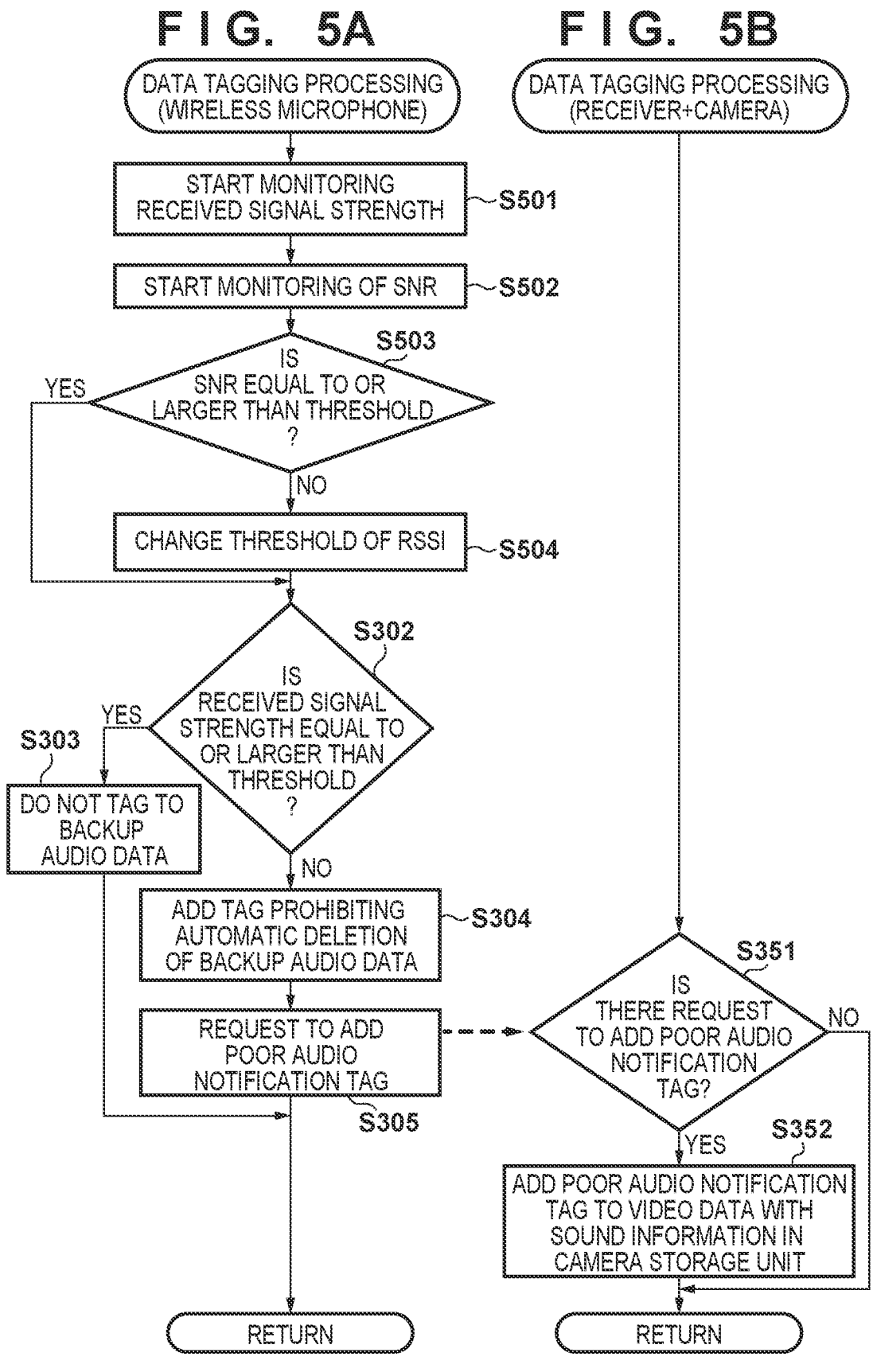
F I G. 5A
F I G. 5B

F I G. 8A

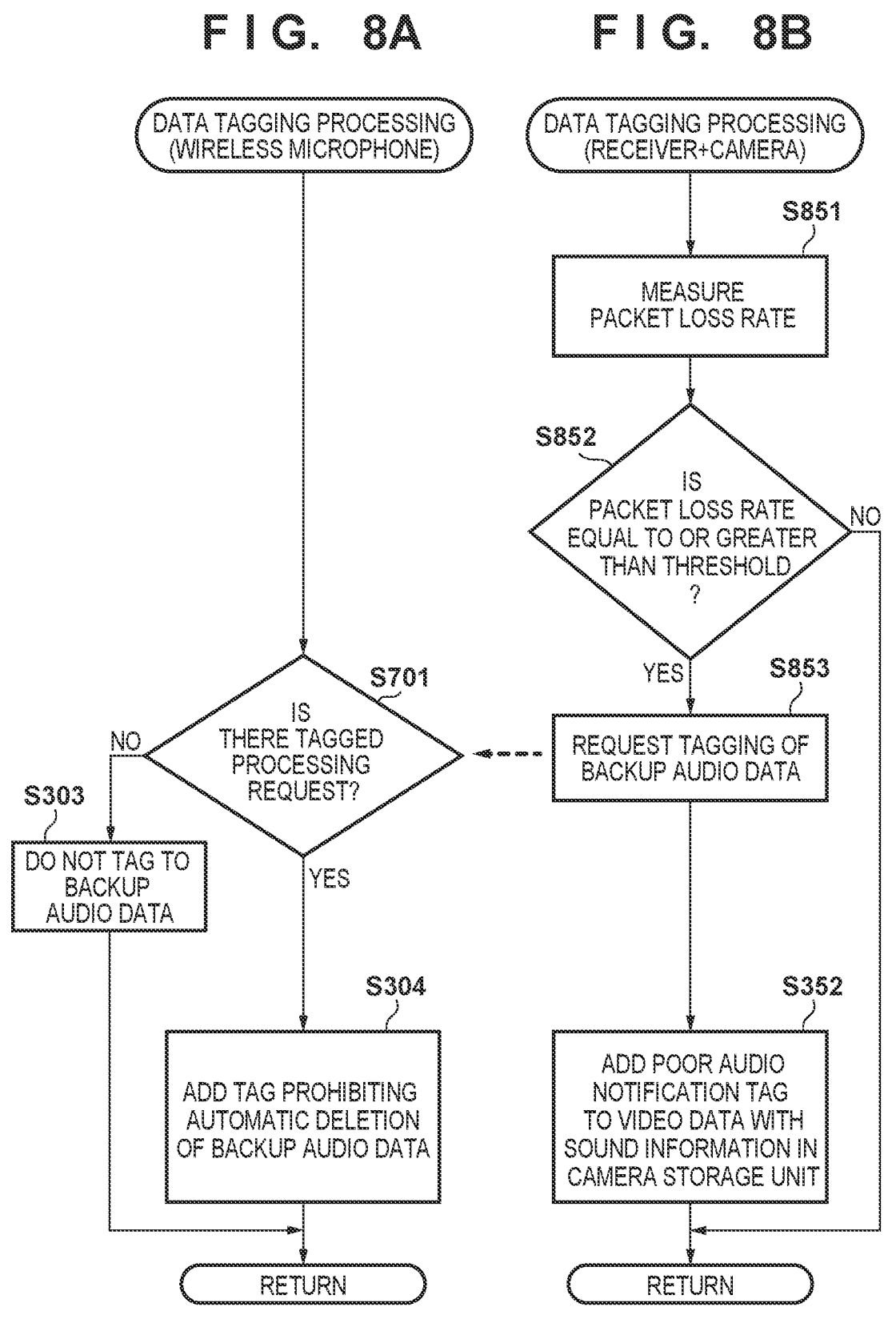

DATA TAGGING PROCESSING
(WIRELESS MICROPHONE)

S701

IS
THERE TAGGED
PROCESSING
REQUEST?

NO

S303

DO NOT TAG TO
BACKUP
AUDIO DATA

YES

S304

ADD TAG PROHIBITING
AUTOMATIC DELETION
OF BACKUP AUDIO DATA

RETURN

F I G. 8B

DATA TAGGING PROCESSING
(RECEIVER+CAMERA)

S851

MEASURE
PACKET LOSS RATE

S852

IS
PACKET LOSS RATE
EQUAL TO OR GREATER
THAN THRESHOLD
?

NO

YES

S853

REQUEST TAGGING OF
BACKUP AUDIO DATA

S352

ADD POOR AUDIO
NOTIFICATION TAG
TO VIDEO DATA WITH
SOUND INFORMATION IN
CAMERA STORAGE UNIT

RETURN

COMMUNICATION APPARATUS, CONTROL METHOD FOR COMMUNICATION APPARATUS, AND STORAGE MEDIUM

BACKGROUND OF THE INVENTION

Field of the Invention

The present invention relates to a communication apparatus, a control method for a communication apparatus, and a storage medium.

Description of the Related Art

A known technique stores transmitted or received audio data as recorded data in a storage medium for keeping a record when audio data is wireless transmitted and received.

With such a technique, when recorded data is accumulated, the remaining storage space of the storage medium decreases, making it necessary to delete data stored on the storage medium. In the technique proposed in Japanese Patent No. 6108788, when performing a backup of audio data transmitted and received in wireless maritime communication, tags relating to the importance of the audio data are attached and, according to the tags, the order for automatically deleting the backup audio data is changed.

However, when wireless communication is actually performed, audio data transmitted by one apparatus may not be received by the communication partner, or the quality of the received audio data may be reduced. Japanese Patent No. 6108788 described above does not take into account how to handle the backup of audio data with a possibility of the communication partner being unable to receive it as expected.

SUMMARY OF THE INVENTION

The present invention has been made in consideration of the aforementioned problems and realizes a technique enabling appropriate handling of audio data for backup.

In order to solve the aforementioned issues, one aspect of the present disclosure provides a communication apparatus that includes an audio capturing unit, comprising: a communication unit configured to wirelessly communicate with an external apparatus and transmit audio data captured by the audio capturing unit; a storage unit configured to store the audio data captured by the audio capturing unit; and a control unit configured to control deletion of the audio data stored in the storage unit according to a predetermined rule, wherein in a case where a wireless communication state with the external apparatus relating to transmission of the captured audio data does not satisfy a predetermined condition, the control unit performs control so that the audio data stored in the storage unit is not deleted according to the predetermined rule.

Another aspect of the present disclosure provides a communication apparatus, comprising: a communication unit configured to wirelessly communicate with an external apparatus that includes an audio capturing unit and receive audio data captured by the external apparatus; and a control unit configured to control transmission of information to the external apparatus according to a wireless communication state with the external apparatus relating to reception of the audio data, wherein in a case where the wireless communication state with the external apparatus relating to reception of the audio data does not satisfy a predetermined condition, the control unit transmits information indicating prohibition of deletion of the audio data stored in a storage unit by the external apparatus according to a predetermined rule.

Still another aspect of the present disclosure provides a method of controlling a communication apparatus that includes an audio capturing unit, comprising: wirelessly communicating with an external apparatus and transmitting audio data captured by the audio capturing unit; storing the audio data captured by the audio capturing unit in a storage unit; and controlling deletion of the audio data stored in the storage unit according to a predetermined rule, wherein in a case where a wireless communication state with the external apparatus relating to transmission of captured audio data does not satisfy a predetermined condition, in the controlling, control is performed so that the audio data stored in the storage unit is not deleted according to the predetermined rule.

Yet another aspect of the present disclosure provides a non-transitory computer-readable storage medium comprising instructions for performing a method of controlling a communication apparatus that includes an audio capturing unit, the method comprising: wirelessly communicating with an external apparatus and transmitting audio data captured by the audio capturing unit; storing the audio data captured by the audio capturing unit in a storage unit; and controlling deletion of the audio data stored in the storage unit according to a predetermined rule, wherein in a case where a wireless communication state with the external apparatus relating to transmission of captured audio data does not satisfy a predetermined condition, in the controlling, control is performed so that the audio data stored in the storage unit is not deleted according to the predetermined rule.

According to the present invention, audio data for backup can be appropriately handled.

Further features of the present invention will become apparent from the following description of exemplary embodiments (with reference to the attached drawings).

BRIEF DESCRIPTION OF THE DRAWINGS

FIG. 1 is a block diagram illustrating an example of the configuration of an imaging system according to a first embodiment.

FIGS. 2A and 2B are flowcharts illustrating a series of operations of video capture according to the first embodiment.

FIGS. 3A and 3B are flowcharts for describing a series of operations of tagging processing for audio data during video capture operation according to the first embodiment.

FIGS. 5A and 5B are flowcharts for describing a series of operations of tagging processing for audio data during video capture operation according to a second embodiment.

FIGS. 8A and 8B are flowcharts for describing tagging processing for audio data during video capture operation according to a fifth embodiment.

DESCRIPTION OF THE EMBODIMENTS

First Embodiment

Figure 4:
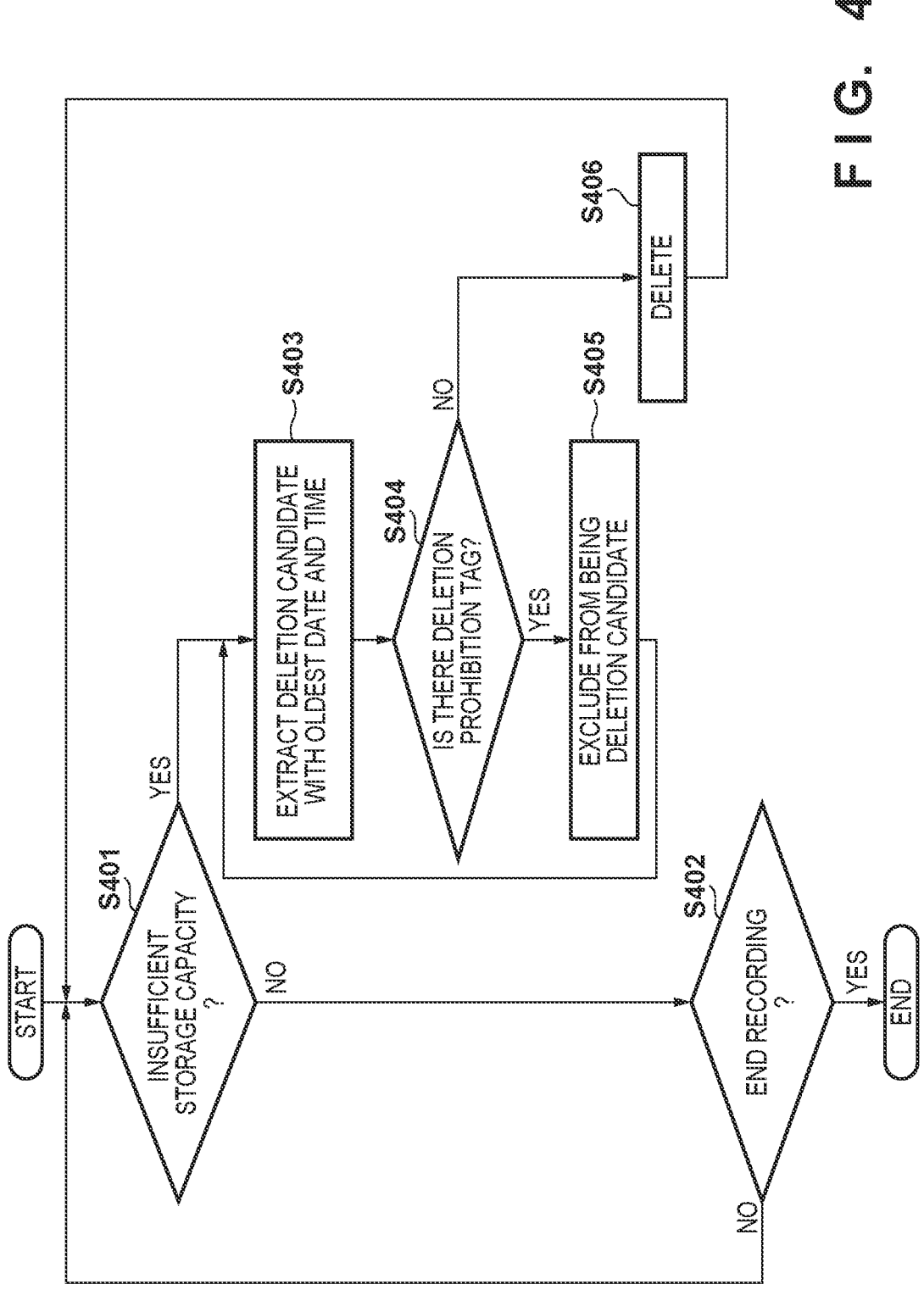
FIG. 4 is a flowchart illustrating operations of automatic deletion prohibition performed by a wireless microphone storage unit according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the example described below, a wireless microphone that can capture audio of a user's speech is used as an example of a communication apparatus. However, the present embodiment is not limited to a wireless microphone and is applicable to other devices that can capture audio. Examples of such devices may include, for example, a wireless earphone, a smartphone, a game console, a tablet terminal, and other information terminals. Also, in the example described below, a digital camera that can record received audio data as well as video data is used as an example of an imaging device. However, the present embodiment is not limited to a digital camera and is applicable to other devices that can stored received audio data together with video data. Examples of such devices may include, for example, a smartphone, a game console, a tablet terminal, a personal computer, and the like.

An example of the functional configuration of an imaging system according to the first embodiment will now be described with reference to FIG. 1. The imaging system according to the first embodiment includes a wireless communication camera 100, a receiver 300, and a wireless microphone 400, for example. Note that one or more functional blocks illustrated in FIG. 1 may be implemented by hardware, such as an application-specific integrated circuit (ASIC) or a programmable logic array (PLA), or implemented by a programmable processor, such as a central processing unit (CPU) or a microprocessing unit (MPU), executing software. Also, these may be implemented by a combination of software and hardware.

The wireless microphone 400 according to the present embodiment transmits audio data obtained by capturing audio of the surroundings to the receiver 300 via wireless communication. The audio data received by the receiver 300 is transmitted to the camera 100. In other words, the camera 100 receives the audio data transmitted from the wireless microphone 400 via the receiver 300. Note that, as described below, the wireless microphone 400 can also store captured audio data. Note that in the example illustrated in FIG. 1, a replaceable imaging lens 200 is used. However, the present embodiment is not particularly limited to using a replaceable imaging lens. The camera 100 may include a built-in imaging lens. Also, the camera 100 may include a part or all of the functional configuration of the receiver 300.

As illustrated in FIG. 1, the imaging lens 200 is installed at the front surface of the camera 100. The imaging lens 200 is replaceable, and the camera 100 and the imaging lens 200 are electrically connected via a mount contact group 103. The receiver 300 is installed at the upper surface of the camera 100. The receiver 300 is configured to be replaceable, and the camera 100 and the receiver 300 are electrically connected via an ACC shoe contact group 109.

First, an example of the configuration of the camera 100 will be described. A camera control unit 101 includes one or more processors (for example, a CPU) for controlling the operations of the units of the camera 100 and also includes a built-in memory for storing various types of adjustment values, programs for executing various types of control, and the like. The built-in memory functions as a buffer memory for temporarily storing various types of data processed at each location. The camera control unit 101 controls the various types of operations of the camera 100 by executing a program stored in the built-in memory or a camera storage unit 107.

An image sensor 102 converts light from an object incident via a lens 202 into an electrical signal, generates an image signal including a still image or video, and outputs this to the camera control unit 101. A shutter 104, for example, is a focal plane shutter disposed between the image sensor 102 and the lens 202 that operates as instructed by the camera control unit 101. The shutter 104 is constituted by a front curtain and a rear curtain. When the front curtain moves, the shutter opens and exposure of the image sensor 102 starts. When the rear curtain moves, the shutter closes and exposure of the image sensor 102 ends.

A camera operation unit 105 includes an operation member operated by a user. The camera operation unit 105 detects a user operation via a button, switch, dial, connection device, or the like attached to the camera 100 and transmits a signal according to the operation instruction to the camera control unit 101. In the case of capturing a still image, the camera operation unit 105 outputs, to the camera control unit 101, an instruction signal (SW1 signal) sent when the user performs a half press of the release button and an instruction signal (SW2 signal) sent when the user performs a full press to deeply press the release button. In the case of capturing a video, the camera operation unit 105 outputs, to the camera control unit 101, an instruction signal (REC signal) sent when the user operates the record button.

A camera display unit 106 displays imaging information and captured images as instructed by the camera control unit 101. The camera control unit 101 controls the operations of the camera 100 on the basis of an output signal of the camera operation unit 105. In a case where the output signal of the camera operation unit 105 is the SW1 signal, the image sensor 102 is driven and imaging is performed and focus information such as the defocus amount of each distance measuring point is output. Also, the object is detected from the imaging result, photometry control (AE operation) to measure the brightness of the object is repeated together, and the shutter speed, f-number, and ISO sensitivity used when imaging are determined on the basis of the photometry result. Here, the shutter speed, f-number, and ISO sensitivity used when imaging are collectively referred to as exposure control values. The determined exposure control values are displayed on the screen of the camera display unit 106. In a case where the output signal of the camera operation unit 105 is the SW2 signal, a diaphragm 203 is driven via a lens control unit 201, the sensitivity (ISO sensitivity) of the image sensor 102 is set, and the shutter 104 is controlled to emit light at the image sensor 102. In a case where the output signal of the camera operation unit 105 is the REC signal, the sensitivity (ISO sensitivity) of the image sensor 102 and the frame rate is set, the image sensor 102 is driven and imaging is performed, and focus information such as the defocus amount of each distance measuring point is output. Also, the object is detected from the imaging result and light is emitted at the image sensor 102 while photometry control (AE operation) to measure the brightness of the object is repeated. The lens control unit 201 described below drives the focus lens (not illustrated) for adjusting the focus in the imaging lens 200 and repeats autofocus as instructed by the camera control unit 101. The camera control unit 101 performs control to display the captured image on the camera display unit 106 according to the still image data or the video data obtained from the image sensor 102 and to write the still image data or the video data (including attached sound information) to the camera storage unit 107.

A camera wireless communication unit 108 performs wireless communication between the camera 100 and an external apparatus. The camera wireless communication unit 108, for example, transmits and receives image data, audio data, compressed image data, compressed audio data, and similar types of data, for example. Also, the camera wireless communication unit 108 transmits and receives control signals relating to imaging such as imaging start and end commands and other information. The camera wireless communication unit 108, for example, is an infrared communication module, a Bluetooth (registered trademark) communication module, a wireless LAN communication module, a Wireless USB or similar wireless communication module, or the like. Also, in the example configuration of the present embodiment described herein, audio data from the wireless microphone 400 is received via the receiver 300. However, the camera wireless communication unit 108 may have the functional configuration of the receiver 300, and the camera 100 may perform wireless communication directly with the wireless microphone 400.

A camera audio input unit 110 captures audio of the surroundings of the camera 100 via a built-in microphone, an external microphone connected via an audio input terminal, or the like, performs analog-to-digital conversion, and transmits this to the camera control unit 101. The camera control unit 101 executes, on the input digital audio data, audio-related processing such as level optimization processing, specific frequency reduction processing, audio detection processing, and the like and executes processing to combine the video data obtained by the image sensor 102 and the audio data obtained from the wireless microphone 400. The camera control unit 101 performs control to write the combined data to the camera storage unit 107 as video data with sound information. Note that the microphone may be a monaural or a stereo microphone.

Next, an example of the configuration of the imaging lens 200 will be described. The lens control unit 201 includes one or more processors (for example, a CPU) for controlling the operations of the units of the imaging lens 200. The lens 202 is constituted by a plurality of lenses and focuses the object image on the image sensor 102. The diaphragm 203 for adjusting the amount of light and the focus lens (not illustrated) for adjusting the focus are also provided in the lens 202. The lens control unit 201 adjusts the amount of light taken inside the camera 100 and the focus according to an instruction from the camera control unit 101 under control via the mount contact group 103 and transmits the distance information and the like of this time to the camera control unit 101.

An example of the configuration of the receiver 300 will also now be described. A receiver control unit 301 includes one or more processors (for example, a CPU) for controlling the operations of the units of the receiver 300. The receiver control unit 301, for example, executes a program stored in the built-in memory of the receiver control unit 301 to control the various types of operations of the receiver 300. The receiver control unit 301 can communicate with the camera control unit 101 via the ACC shoe contact group 109. The receiver control unit 301 can transmit and receive audio data and compressed audio data as well as setting instructions from the camera 100, camera information, receiver information, wireless microphone information, and the like.

A receiver wireless communication unit 302, as with the camera wireless communication unit 108, performs wireless communication between the receiver 300 and an external apparatus. The receiver wireless communication unit 302 transmits and receives data such as audio data and compressed audio data with an external apparatus and transmits and receives control signals relating to imaging such as imaging start and end commands and other information, for example. The receiver wireless communication unit 302, for example, is an infrared communication module, a Bluetooth (registered trademark) communication module, a wireless LAN communication module, a Wireless USB or similar wireless communication module, or the like.

A receiver operation unit 303 includes an operation member operated by the user and detects a user operation via a button, dial, or the like attached to the receiver 300 and transmits a signal according to the operation instruction to the receiver control unit 301. A receiver display unit 304 displays information such as the communication state and mute as instructed by the receiver control unit 301.

A receiver audio input unit 305, as with the camera audio input unit 110, captures audio of the surroundings of the receiver 300 via a built-in microphone or the like, performs analog-to-digital conversion, and transmits this to the receiver control unit 301. Note that the microphone may be a monaural or a stereo microphone.

Next, an example of the configuration of the wireless microphone 400 will be described. A wireless microphone control unit 401 includes one or more processors (for example, a CPU) for controlling the operations of the units of the wireless microphone 400. The wireless microphone control unit 401, for example, executes a program stored in a wireless microphone storage unit 406 to control the various types of operations of the wireless microphone 400. The wireless microphone control unit 401 can perform wireless communication with the receiver control unit 301 via a wireless microphone wireless communication unit 402 and the receiver wireless communication unit 302. The wireless microphone control unit 401 can transmit and receive audio data and compressed audio data as well as setting instructions from the camera 100, camera information, receiver information, wireless microphone information, and the like.

The wireless microphone wireless communication unit 402, as with the camera wireless communication unit 108 and the receiver wireless communication unit 302, can perform wireless communication with an external apparatus. The wireless microphone wireless communication unit 402 transmits and receives audio data and compressed audio data obtained by a wireless microphone audio input unit 405 described below and information such as the individual identification number of the wireless microphone 400, the battery, mute, and the like as instructed by the wireless microphone control unit 401. The wireless microphone wireless communication unit 402, for example, is an infrared communication module, a Bluetooth (registered trademark) communication module, a wireless LAN communication module, a Wireless USB or similar wireless communication module, or the like.

A wireless microphone operation unit 403 includes an operation member operated by the user and detects a user operation via a button, dial, or the like attached to the wireless microphone 400 and transmits a signal according to the operation instruction to the wireless microphone control unit 401.

A wireless microphone display unit 404 displays information such as the communication state, mute, and battery as instructed by the wireless microphone control unit 401. Also, the individual identification number of the wireless microphone 400 is displayed. The individual identification number may be a serial number or the like.

The wireless microphone audio input unit 405 captures audio of the surroundings of the wireless microphone 400 via a built-in microphone, an external microphone connected via an audio input terminal, or the like, performs analog-to-digital conversion, and transmits this to the wireless microphone control unit 401. Also, the audio data obtained by capturing and analog-to-digital conversion is also simultaneously stored in the wireless microphone storage unit 406 as backup audio data. The microphone is a monaural microphone, for example. The configuration of the wireless microphone audio input unit 405 may be similar to that of the camera audio input unit 110 and the receiver audio input unit 305.

In capturing a video using the wireless microphone 400 as described below, the audio data captured by the wireless microphone 400 is transmitted to the receiver 300, and processing is executed to combine the audio data with the video data captured by the camera 100 to which the receiver 300 is connected. The data obtained via combining processing is stored in the camera storage unit 107 as video data with sound information. Also, in the wireless microphone 400, the audio data is stored in the wireless microphone storage unit 406 in the wireless microphone 400 as backup audio data. The backup audio data can be read out after the end of imaging and can be replaced with the audio data combined with the video data with sound information stored in the camera 100.

The backup audio data stored in the wireless microphone 400 is an audio file, and audio data uses a large amount of data. Thus, the storage capacity of the wireless microphone storage unit 406 may run out. Accordingly, in a situation where imaging data cannot be checked for a long period of time, such as when video recording for a long period of time, it is necessary to appropriately control the deletion of required backup audio data.

Video Capturing Series of Operations

A series of operations for capturing video using the wireless microphone 400, the receiver 300, and the camera 100 according to the present embodiment will be described below with reference to FIGS. 2 to 4.

FIGS. 2A and 2B illustrate a series of operations for capturing video according to the present embodiment. FIG. 2A illustrates the processing of the wireless microphone 400, and FIG. 2B illustrates the processing of the receiver 300 and the camera 100. The operations of the wireless microphone 400 are implemented by the wireless microphone control unit 401 executing a program stored in the wireless microphone storage unit 406 unless otherwise described. Also, the operations of the receiver 300 are implemented by the receiver control unit 301 executing a program stored in the built-in memory, for example, unless otherwise described. Furthermore, the operations of the camera 100 are implemented by the camera control unit 101 executing a program stored in the camera storage unit 107, for example, unless otherwise described. Note that the operations illustrated in FIGS. 2A and 2B are started when the wireless microphone 400 and the receiver 300 are in a wirelessly connected state.

In step S251, the camera control unit 101 starts video capture according to a user operation of the camera operation unit 105. In step S252, the camera control unit 101 notifies the wireless microphone 400 that video capture has started via the receiver 300.

In step S201, the wireless microphone control unit 401 receives the video capture start notification from the camera 100. Then, in step S202, the wireless microphone control unit 401 starts capturing the audio of the surroundings with the wireless microphone audio input unit 405.

In step S203, the wireless microphone control unit 401 performs analog-to-digital conversion on the captured audio and generates audio data. In step S204, the wireless microphone control unit 401 starts real-time transmission (in other words, transmission as audio is captured) of the audio data generated in step S203 to the receiver 300 via the wireless microphone wireless communication unit 402. The wireless microphone control unit 401 continues the real-time transmission of audio data until the video capture ends, for example.

In step S205, the wireless microphone control unit 401 starts the storage of the audio data (backup audio data) as a backup also in the wireless microphone storage unit 406, and the processing proceeds to the data tagging processing of step S206.

In step S253, the receiver control unit 301 receives the audio data from the wireless microphone 400 via the receiver wireless communication unit 302. In step S254, the camera control unit 101 obtains the audio data from the receiver 300, executing processing to combine the obtained audio data and the captured video data, and generates video data with sound information. In step S255, the camera control unit 101 starts the storage of the video data with sound information generated in step S254 in the camera storage unit 107, and then the processing proceeds to the data tagging of step S256. The data tagging processing in steps S206 and S256 will now be described in detail with reference to FIGS. 3A and 3B.

Data Tagging Processing Series of Operations

A series of processes of the data tagging processing according to the present embodiment will now be described with reference to FIGS. 3A and 3B. FIG. 3A illustrates the processing of the wireless microphone 400, and FIG. 3B illustrates the processing of the receiver 300 and the camera 100. As described above, the processing of the wireless microphone 400, the receiver 300, and the camera 100 are executed by the wireless microphone control unit 401, the receiver control unit 301, and the camera control unit 101, respectively, unless otherwise described.

In step S301, the wireless microphone control unit 401 starts monitoring the state of the wireless communication with the camera 100 via the wireless microphone wireless communication unit 402. Specifically, the received signal strength indicator (RSSI) of the electromagnetic wave signals transmitted from the receiver 300 is monitored. A received signal strength indicator that is high (closer to 0 dBm) indicates a strong electromagnetic wave state. Typically, from −30 dBm to −40 dBm indicates a stable wireless connection, −60 dBm or less indicates the start of an unstable wireless connection, and −90 dBm or less indicates a poor wireless connection.

In step S302, the wireless microphone control unit 401 determines whether or not the received signal strength indicator being monitored is equal to or greater than a threshold. For example, the received signal strength indicator threshold may be set to around −60 dBm. In a case where the wireless microphone control unit 401 determines that the received signal strength indicator is equal to or greater than the threshold, the processing proceeds to step S303. In other words, the wireless microphone control unit 401 can determine that the wireless communication with the receiver 300 is in a stable state and that the audio data being transmitted from the wireless microphone 400 to the receiver 300 has a high possibility of being received in a good state. In a case where the wireless microphone control unit 401 determines that the received signal strength indicator is less than the threshold, the processing proceeds to step S304. In this case, the wireless microphone control unit 401 can determine that there is a high possibility of the audio data being transmitted from the wireless microphone 400 to the receiver 300 being choppy, unclear, or of bad quality.

In step S303, the audio data being transmitted has a high possibility of being received in a good state. Thus, the wireless microphone control unit 401 continues the storage of the audio data in the wireless microphone storage unit 406 as normal backup audio data. Then, the wireless microphone control unit 401 ends the processing without executing tag processing on the stored audio data. Thereafter, the wireless microphone control unit 401 returns the processing back to the caller.

In step S304, since there is a high possibility that the transmitted audio data is in a reduced quality state, the wireless microphone control unit 401 tags the audio data stored in the wireless microphone storage unit 406 as backup audio data for prohibition of automatic deletion. For example, the wireless microphone control unit 401 changes the permission information of the file attributes of the audio data file and sets it to deletion prohibited. Note that the tag for prohibition of automatic deletion is an example of information indicating the prohibition of deletion according to a predetermined rule (in other words, automatic deletion). The control method for not deleting stored audio data is not limited to this example, and another method may be used. The details of the data tagging processing relating to automatic deletion prohibition will be described below with reference to FIG. 4.

Simultaneously, in step S305, the wireless microphone control unit 401 transmits, to the receiver 300, a request for information tagging (poor audio notification tag) indicating the possibility of the audio data being transmitted having reduced quality. Thereafter, the wireless microphone control unit 401 ends the data tagging processing returns the processing back to the caller.

In step S351, the receiver control unit 301 determines whether or not a request for poor audio notification tagging has been received from the wireless microphone 400. In a case where the receiver control unit 301 determines that a request for poor audio notification tagging has been received, the processing proceeds to step S352. Otherwise, the data tagging processing ends, and the processing returns to the caller.

In step S352, the camera control unit 101 tags the video data with sound information stored in the camera storage unit 107 with a poor audio notification tag. At this time, for example, to tag the video data with sound with a poor audio notification tag, the camera control unit 101 incorporates them as a video data with audio file. Note that the tagging method is not limited to this example, and another method may be used. In the present embodiment, the video data with sound information is tagged with a poor audio notification tag. This makes it easy to distinguish video data with sound information with a high possibility of the quality of the audio data being in a reduced state when reproducing the audio data after capturing has ended and reduces the effort involved in checking the audio data using the camera 100. Thereafter, the camera control unit 101 ends the data tagging processing and returns the processing back to the caller.

Returning to FIGS. 2A and 2B, a series of operations of the video capture will now be described. In step S257, the camera control unit 101 determines whether or not to end the video capture. In a case where the camera control unit 101 determines not to end the video capture on the basis of an operation of the camera operation unit 105, for example, the processing returns to step S253, and video capture continues. In a case where the camera control unit 101 determines to end video capture, data storage to the camera storage unit 107 also ends, and the processing proceeds to step S258.

In step S258, the camera control unit 101 notifies the wireless microphone 400 of the end of video capture (via the receiver 300) and then ends the operations relating to video capture on the camera 100 side.

In step S207, the wireless microphone control unit 401 determines whether or not a video capture end notification has been received from the receiver 300. In a case where the wireless microphone control unit 401 determines that a video capture end notification has not been received, the processing returns to step S202. In other words, the wireless microphone control unit 401 continues the real-time transmission of the captured audio data to the camera side and continues monitoring whether the wireless situation is one that requires the backup audio data to be tagged with an automatic deletion prohibition tag. In a case where the wireless microphone control unit 401 determines that a video capture end notification has been received, the processing proceeds to step S208, and the operations (in other words, storage of the backup audio data from capture and data tagging processing) relating to recording on the wireless microphone 400 side end.

Automatic Deletion Prohibition Series of Operations for Wireless Microphone 400

Next, a series of operations of automatic deletion prohibition processing for the wireless microphone 400 according to the present embodiment will be described with reference to FIG. 4. Note that the automatic deletion prohibition processing is executed by the wireless microphone control unit 401 unless otherwise described.

In step S401, the wireless microphone control unit 401 determines whether or not the storage capacity of the wireless microphone storage unit 406 will be insufficient during the video capture describe in FIG. 2A. In a case where the wireless microphone control unit 401 determines that the storage capacity is not insufficient, the processing proceeds to step S402. In a case where the wireless microphone control unit 401 determines that the storage capacity is insufficient, the processing proceeds to step S403.

In step S402, the wireless microphone control unit 401 determines whether or not to end audio data recording. In a case where the wireless microphone control unit 401 determines to continue recording, the processing returns to step S401. In a case where the wireless microphone control unit 401 determines to end recording, the automatic deletion prohibition processing ends.

In step S403, the wireless microphone storage unit 406, as instructed by the wireless microphone control unit 401, arranges the stored audio data in order of date and time stored from the oldest and, for example, extracts the audio data with the oldest date and time stored as a deletion candidate. In step S404, the wireless microphone control unit 401 determines whether the deletion candidate audio data is tagged with an automatic deletion prohibition tag. In a case where the wireless microphone control unit 401 determines that the extracted deletion candidate audio data is tagged with an automatic deletion prohibition tag, the processing proceeds to step S405. In step S405, the wireless microphone control unit 401 excludes that audio data for processing that is tagged with an automatic deletion prohibition tag from being a deletion candidate. Thereafter, the processing returns to step S403, and the wireless microphone control unit 401 extracts the next deletion candidate.

In step S404, in a case where the wireless microphone control unit 401 determines that the deletion candidate audio data is not tagged with an automatic deletion prohibition tag, the processing proceeds to step S406. In step S406, the wireless microphone control unit 401 deletes the extracted audio data from the wireless microphone storage unit 406. Thereafter, the processing returns to step S401, and the wireless microphone control unit 401 repeats the processing for deleting audio data until capacity is freed up in the wireless microphone storage unit 406.

As described above, in the present embodiment, the wireless microphone 400 communicates wirelessly with the receiver 300 and transmits captured audio data and stores the captured audio data in the wireless microphone storage unit 406. At this time, to resolve the wireless microphone storage unit 406 having insufficient capacity, the wireless microphone 400 performs control to delete stored audio data according to a predetermined rule (for example, according to the amount of time elapsed since stored). In the present embodiment, also, in a case where the wireless communication state does not satisfy a predetermined condition (the received signal strength indicator is less than the threshold), control is performed to not delete the target backup audio data stored in the wireless microphone storage unit 406 according to the predetermined rule. In this manner, even in a situation where audio data of a sufficient quality cannot be received by the receiver 300, audio data can be provided to the camera 100 without automatically deleting audio data from the wireless microphone storage unit 406. In other words, the audio data for backup in the wireless microphone 400 can be appropriately handled.

Note that to simplify the description of the present embodiment, an example of automatic deletion prohibition tagging has been used. However, deletion of audio data by automatic deletion may be delayed. Specifically, an order for not being automatically deleted may be set with tags added for deletion priority or importance.

Second Embodiment

Next, data tagging processing according to the second embodiment will be described with reference to FIGS. 5A and 5B. In the first embodiment described above, a threshold for the received signal strength indicator is used to determine the wireless communication state. In the second embodiment, to determine the wireless communication state, in addition to the received signal strength indicator, the signal-to-noise ratio (SNR) is also taken into account. Note that in the present embodiment, the data tagging processing is different to that in the embodiment described above. However, the configuration of the wireless microphone 400, the receiver 300, and the camera 100 and the other processing are essentially the same. Thus, configurations and processing which are essentially the same are given the same reference number and the descriptions thereof are omitted. The differences will be focused on in the following description.

FIG. 5A illustrates the processing of the wireless microphone 400, and FIG. 5B illustrates the processing of the receiver 300 and the camera 100. Note that the processing of the wireless microphone 400, the receiver 300, and the camera 100 are executed by the wireless microphone control unit 401, the receiver control unit 301, and the camera control unit 101, respectively, unless otherwise described.

In step S501, the wireless microphone control unit 401 starts monitoring the wireless communication state with the receiver 300, that is, the received signal strength indicator (RSSI) of the electromagnetic wave signal transmitted from the receiver 300, via the wireless microphone wireless communication unit 402.

In step S502, the wireless microphone control unit 401 starts monitoring the noise floor measurement value and calculates SNR. SNR means the difference between the received signal strength indicator and the noise floor. For an audio-based network, a SNR value of 25 dB or greater is recommended, for example. When the SNR is low, a situation is caused in which there are many noise components and communication is inhibited by electromagnetic wave interference making communication impossible regardless of the strength of the received signal strength indicator (the connection is choppy regardless of the strength of the electromagnetic waves).

In step S503, the wireless microphone control unit 401 determines whether or not the SNR is equal to or greater than the threshold. In a case where the wireless microphone control unit 401 determines that the SNR is equal to or greater than the threshold, the processing proceeds to step S505 without a change to the received signal strength indicator threshold. On the other hand, in a case where the wireless microphone control unit 401 determines that the SNR is less than the threshold, the effect of electromagnetic wave interference is determined to be great, and the processing proceeds to step S504. In step S504, due to the electromagnetic wave interference being great, the wireless microphone control unit 401 changes the received signal strength indicator threshold by increasing it to make the criterion for the received signal strength indicator stricter.

Thereafter, as in the first embodiment described above, the wireless microphone control unit 401 executes the processing of step S302 onward. Also as in the first embodiment described above, the camera control unit 101 executes the operations of step S351 onward.

As describe above, in the present embodiment, the wireless microphone control unit 401 takes into account not only the received signal strength indicator but also the SNR. Thus, compare to using only the received signal strength indicator, the quality of the transmitted audio data can be estimated with a better accuracy. In other words, the automatic deletion of backup audio data with a high possibility of having poor audio quality can be appropriately prohibited.

Third Embodiment

Next, data tagging processing according to the third embodiment will be described with reference to FIGS. 6A and 6B. In the third embodiment, audio data received by the receiver 300 is transmitted unchanged to the wireless microphone 400, and a comparison of the audio data before transmission on the wireless microphone 400 side and the returned audio data is used to determine the wireless communication state. Note that in the present embodiment, the data tagging processing is different to that in the embodiment described above. However, the configuration of the wireless microphone 400, the receiver 300, and the camera 100 and the other processing are essentially the same. Thus, configurations and processing which are essentially the same are given the same reference number and the descriptions thereof are omitted. The differences will be focused on in the following description.

Figures 6A, 6B:
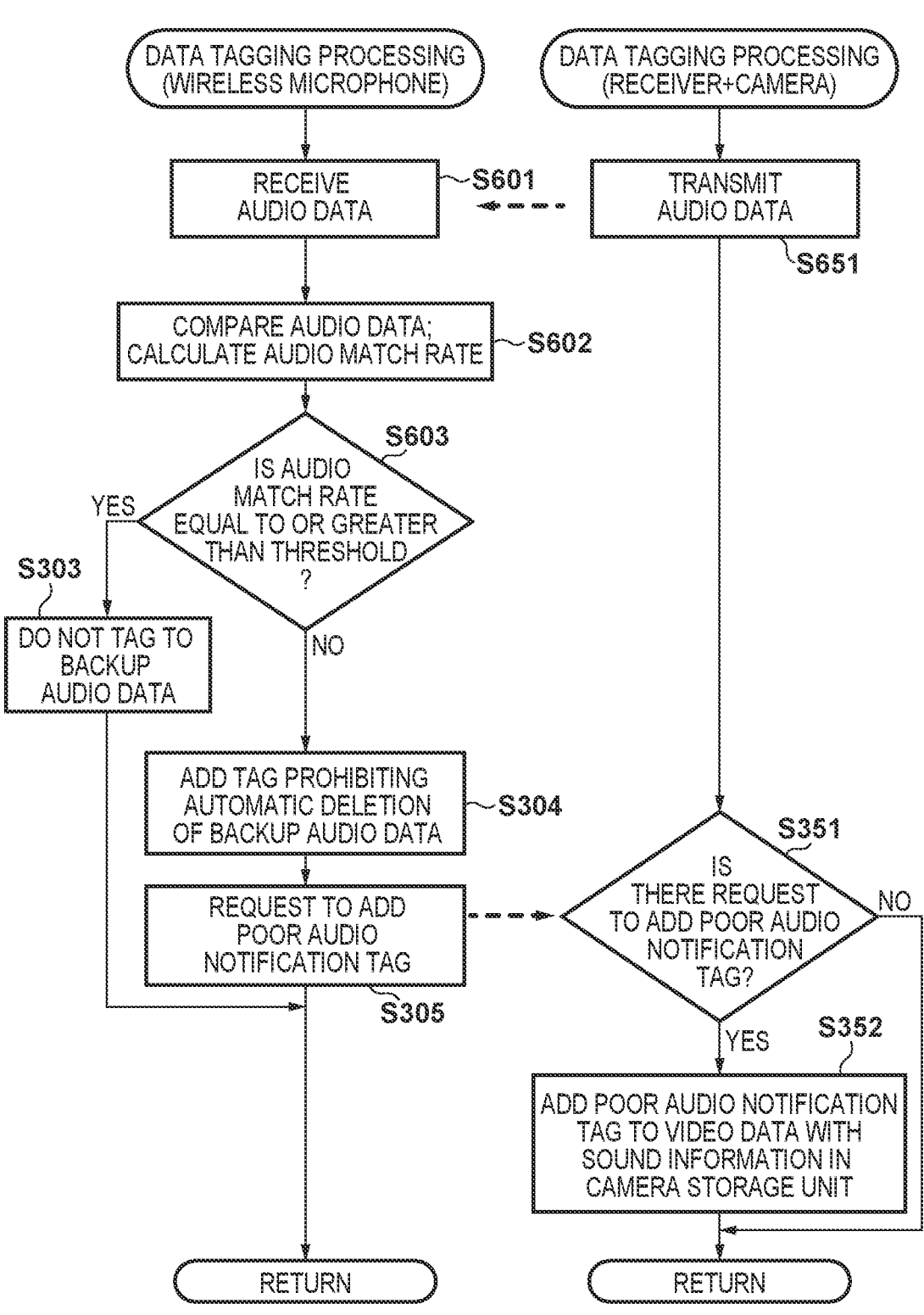
FIGS. 6A and 6B are flowcharts for describing a series of operations of tagging processing for audio data during video capture operation according to a third embodiment.

FIG. 6A illustrates the processing of the wireless microphone 400, and FIG. 6B illustrates the data tagging processing of the receiver 300 and the camera 100. Note that the processing of the wireless microphone 400, the receiver 300, and the camera 100 are executed by the wireless microphone control unit 401, the receiver control unit 301, and the camera control unit 101, respectively, unless otherwise described.

In step S651, the receiver control unit 301 transmits the audio data received in step S253 described above back to the wireless microphone 400 via the receiver wireless communication unit 302.

In step S601, the wireless microphone control unit 401 receives the audio data transmitted from the receiver 300 in step S651. In step S602, the wireless microphone control unit 401 compares the audio data transmitted from the wireless microphone 400 to the receiver 300 in step S204 and the audio data received in step S601 and calculates the audio match rate. Note that the wireless microphone control unit 401, for example, after subtracting an amount set in advance depending on the experiment from the amount of time delay from executing processing for transmitting and receiving twice, may calculate the rate of delay or missing due to the wireless communication state as the audio match rate.

In step S603, the wireless microphone 400 determines whether the calculated audio match rate is equal to or greater than a threshold. In a case where the wireless microphone 400 determines that the audio match rate is equal to or greater than the threshold, the processing proceeds to step S604. In a case where the wireless microphone 400 determines that the audio match rate is less than the threshold, the processing proceeds to step S605.

Thereafter, as in the embodiments described above, the wireless microphone 400 executes the processing of step S303 onward. Also as in the embodiments described above, the camera control unit 101 executes the processing of step S351 onward.

As described above, in the present embodiment, the wireless microphone control unit 401 uses the match rate between the audio data returned from the receiver 300 side and the transmitted audio data to estimate the quality of the transmitted audio data. In this manner, the automatic deletion of backup audio data with a high possibility of having poor audio quality can be appropriately prohibited.

Fourth Embodiment

Next, data tagging processing according to the fourth embodiment will be described with reference to FIGS. 7A and 7B. In the first embodiment described above, the received signal strength indicator on the wireless microphone 400 is monitored. However, the fourth embodiment is different in that the received signal strength indicator on the receiver 300 side is monitored. Note that in the present embodiment, the data tagging processing is different to that in the embodiment described above. However, the configuration of the wireless microphone 400, the receiver 300, and the camera 100 and the other processing are essentially the same. Thus, configurations and processing which are essentially the same are given the same reference number and the descriptions thereof are omitted. The differences will be focused on in the following description.

Figures 7A, 7B:
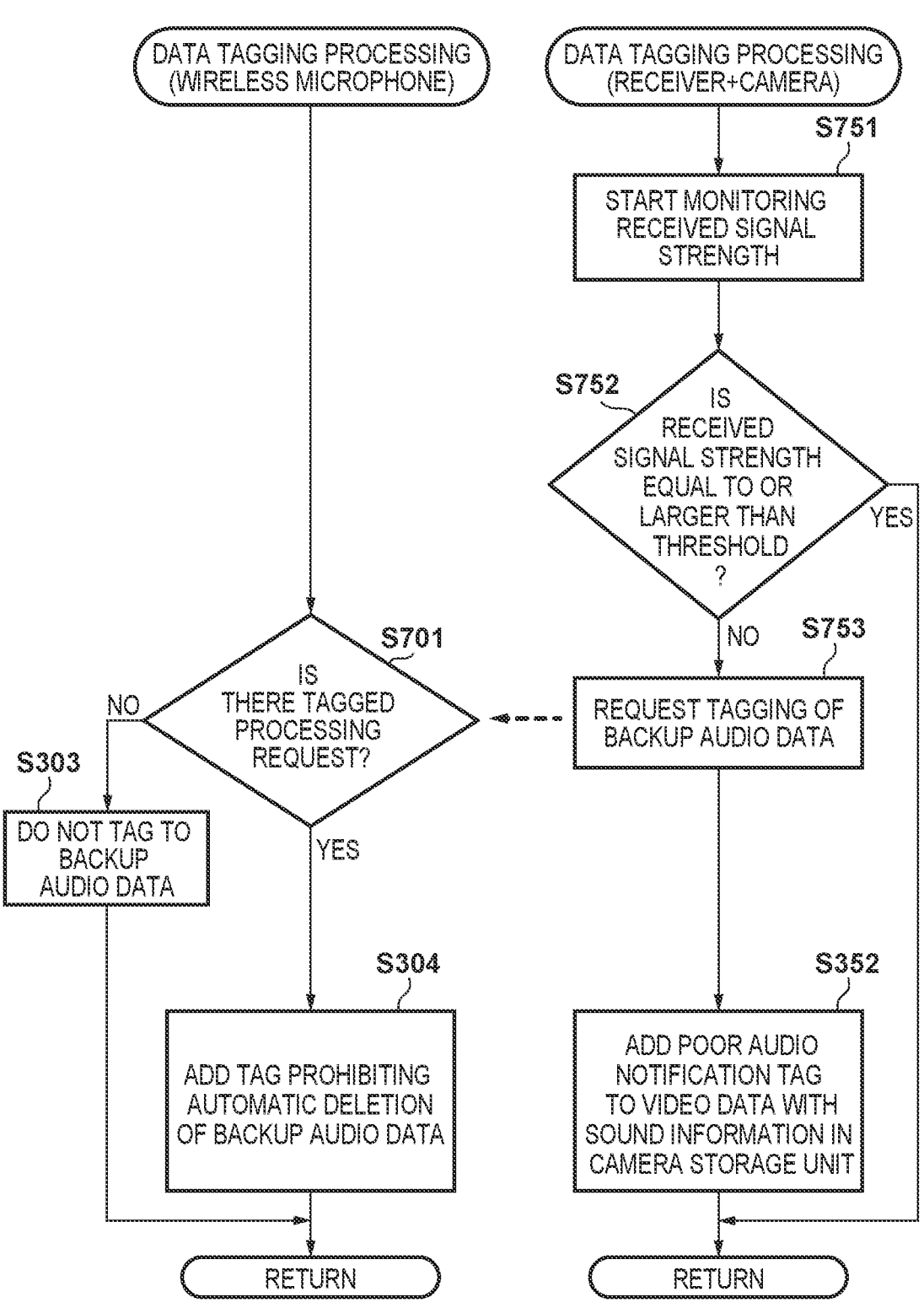
FIGS. 7A and 7B are flowcharts for describing a series of operations of tagging processing for audio data during video capture operation according to a fourth embodiment.

FIG. 7A illustrates the processing of the wireless microphone 400, and FIG. 7B illustrates the data tagging processing of the receiver 300 and the camera 100.

In step S751, the receiver control unit 301 starts monitoring the wireless communication state with the wireless microphone 400, that is, the received signal strength indicator (RSSI) of the electromagnetic waves transmitted from the wireless microphone 400. Note that the camera control unit 101 may obtain the received signal strength indicator measured by the receiver 300.

In step S752, the receiver control unit 301 determines whether or not the received signal strength indicator being monitored is equal to or greater than a threshold. In a case where the receiver control unit 301 determines that the received signal strength indicator is equal to or greater than the threshold, the data tagging processing ends as is, and the processing returns to the caller with the processing proceeding to step S257 in FIG. 2B. In this case, it can be assumed that the wireless communication state is stable and the audio data received from the wireless microphone 400 has a high possibility of being in a good state. On the other hand, in a case where the receiver control unit 301 determines that the received signal strength indicator is less than the threshold, the processing proceeds to step S753. In this case, it can be assumed that the audio data received from the wireless microphone 400 has a high possibility of having reduced quality.

In step S753, since there is a high possibility that the audio data being received has reduced quality, the receiver control unit 301 sends a notification requesting the backup audio data stored in the wireless microphone storage unit 406 to be tagged for automatic deletion prohibition.

As in step S352 described above, simultaneously, the camera control unit 101 tags the video data with sound information stored in the camera storage unit 107 with a poor audio tag. Thereafter, the camera control unit 101 ends the data tagging processing, and the processing proceeds to step S257 in FIG. 2B.

In step S701, the wireless microphone control unit 401 determines whether or not a backup data tagging request has been received from the receiver 300. In a case where the wireless microphone control unit 401 determines that a tagging request has not been received, the processing of step S303 described above is executed. On the other hand, in a case where the wireless microphone control unit 401 determines that a tagging request has been received, the processing of step S304 described above is executed.

As described above, in the present embodiment, the received signal strength indicator on the receiver 300 side is monitored and, depending on the received signal strength indicator, an automatic deletion prohibition tagging request (information indicating automatic deletion prohibition) for the backup audio data is transmitted. In this manner, the automatic deletion of backup audio data with a high possibility of having reduced quality can be appropriately prohibited.

Note that in the example used in the present embodiment, an automatic deletion prohibition tagging request for the backup audio data is transmitted. However, the present embodiment is not limited to transmitting an automatic deletion prohibition tagging request, and information (information indicating a high possibility of the audio data having reduced quality) indicating that the wireless communication state does not satisfy a predetermined condition may be notified. In this manner, the wireless microphone 400 can perform control so that audio data is not automatically deleted.

Fifth Embodiment

Next, data tagging processing according to the fifth embodiment will be described with reference to FIGS. 8A and 8B. In the fourth embodiment, monitoring of the received signal strength indicator is used to determine the wireless communication state. However, the fifth embodiment is different in that the packet loss rate on the receiver 300 and the camera 100 side is used as a criterion. Note that in the present embodiment, the configuration of the wireless microphone 400, the receiver 300, and the camera 100 and the other processing are essentially the same. Thus, configurations and processing which are essentially the same are given the same reference number and the descriptions thereof are omitted. The differences will be focused on in the following description.

FIG. 8A illustrates the processing of the wireless microphone 400, and FIG. 8B illustrates the data tagging processing of the receiver 300 and the camera 100.

In step S851, the receiver control unit 301 measures the packet loss rate of the wireless communication with the wireless microphone 400. The wireless microphone 400 transmits the audio data transmitted in real time in small segmented packets, and all of the packets are collected and reconfigured on the receiver 300, which is the receiving side. When the electromagnetic wave communication situation is unstable, packet loss tends to occur and due to the communication time increasing by an amount equivalent to the time needed to re-transmit and receive the missing packets. This makes the communication delayed and choppy, and the quality of the audio data is reduced. Note that the method for measuring packet loss rate used can be a known method.

In step S852, the receiver control unit 301 determines whether or not the packet loss rate is equal to or greater than a threshold. In a case where the receiver control unit 301 determines that the packet loss rate is equal to or greater than the threshold, the processing proceeds to step S853, and in step S853, the receiver control unit 301 sends a notification of a tagging request for the backup audio data to the wireless microphone side. Also, the receiver control unit 301 executes the processing of step S352 described above and ends the present processing.

On the other hand, in a case where the packet loss rate is less than the threshold, since the packet loss is small, the receiver control unit 301 determines that the state of the audio data transmitted from the wireless microphone 400 is good and ends the data tagging processing without performing data tagging. Thereafter, the receiver control unit 301 returns the processing back to the caller.

As in the fourth embodiment, the wireless microphone 400 executes the processing of steps S700, S303, and S304 and returns the processing back to the caller.

As described above, in the present embodiment, in a case where the packet loss rate obtained on the basis of packets received from the wireless microphone 400 is less than the threshold, a tagging request for the backup audio data is transmitted. In this manner, even when the packet loss rate is a criterion, backup audio data with a high possibility of having reduced audio quality can be selected and prohibited from automatic deletion.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-017828, filed Feb. 8, 2023 which is hereby incorporated by reference herein in its entirety.

What is claimed is:

1. A communication apparatus that includes an audio capturing unit, comprising:

a communication unit configured to wirelessly communicate with an external apparatus and transmit audio data captured by the audio capturing unit;

a storage unit configured to store the audio data captured by the audio capturing unit; and a control unit configured to control deletion of the audio data stored in the storage unit according to a predetermined rule, wherein in a case where a wireless communication state with the external apparatus relating to transmission of the captured audio data does not satisfy a predetermined condition, the control unit performs control so that the audio data stored in the storage unit is not deleted according to the predetermined rule, wherein the communication unit transmits first audio data in response to the audio capturing unit capturing the first audio data and receives second audio data obtained by the external apparatus returning the first audio data transmitted, and the control unit determines whether or not the wireless communication state relating to transmission of the captured audio data satisfies the predetermined condition according to a match rate between the first audio data transmitted and the second audio data returned by the external apparatus.

2. The communication apparatus of claim 1, wherein controlling deletion of the audio data according to the predetermined rule includes deleting the audio data according to time elapsed from when stored in the storage unit.

3. The communication apparatus of claim 1, wherein in a case where the wireless communication state relating to transmission of the captured audio data does not satisfy the predetermined condition, the control unit further adds information indicating prohibition of deletion according to the predetermined rule to the audio data stored in the storage unit.

4. The communication apparatus of claim 1, wherein in a case where the wireless communication state relating to transmission of the captured audio data does not satisfy the predetermined condition, the control unit further delays deletion of the audio data according to the predetermined rule.

5. The communication apparatus of claim 1, further comprising:
a determination unit configured to determine whether or not the wireless communication state relating to transmission of the captured audio data satisfies the predetermined condition.

6. The communication apparatus of claim 1, wherein in a case where information indicating that the wireless communication state relating to transmission of the captured audio data does not satisfy the predetermined condition is received from the external apparatus, the control unit performs control so that the audio data stored in the storage unit is not deleted according to the predetermined rule.

7. The communication apparatus of claim 1, wherein in a case where information indicating prohibition of deletion according to the predetermined rule is received from the external apparatus, the control unit performs control so that the audio data stored in the storage unit is not deleted according to the predetermined rule.

8. The communication apparatus of claim 1, wherein in a case where a received signal strength indicator of an electromagnetic wave signal emitted from the external apparatus is less than a received signal strength indicator threshold, the wireless communication state with the external apparatus does not satisfy the predetermined condition.

9. The communication apparatus of claim 8, wherein the control unit changes the received signal strength indicator threshold depending on a difference between a received signal strength indicator and a noise floor.

10. A method of controlling a communication apparatus that includes an audio capturing unit, comprising:
wirelessly communicating with an external apparatus and transmitting audio data captured by the audio capturing unit;

storing the audio data captured by the audio capturing unit in a storage unit; and
controlling deletion of the audio data stored in the storage unit according to a predetermined rule, wherein
in a case where a wireless communication state with the external apparatus relating to transmission of captured audio data does not satisfy a predetermined condition, in the controlling, control is performed so that the audio data stored in the storage unit is not deleted according to the predetermined rule, wherein
the communicating with the external apparatus includes transmitting first audio data in response to the audio capturing unit capturing the first audio data and receiving second audio data obtained by the external apparatus returning the first audio data transmitted, and
the controlling deletion of the audio data includes determining whether or not the wireless communication state relating to transmission of the captured audio data satisfies the predetermined condition according to a match rate between the first audio data transmitted and the second audio data returned by the external apparatus.

11. A non-transitory computer-readable storage medium comprising instructions for performing a method of controlling a communication apparatus that includes an audio capturing unit, the method comprising:
wirelessly communicating with an external apparatus and transmitting audio data captured by the audio capturing unit;
storing the audio data captured by the audio capturing unit in a storage unit; and
controlling deletion of the audio data stored in the storage unit according to a predetermined rule, wherein
in a case where a wireless communication state with the external apparatus relating to transmission of captured audio data does not satisfy a predetermined condition, in the controlling, control is performed so that the audio data stored in the storage unit is not deleted according to the predetermined rule, wherein
the communicating with the external apparatus includes transmitting first audio data in response to the audio capturing unit capturing the first audio data and receiving second audio data obtained by the external apparatus returning the first audio data transmitted, and
the controlling deletion of the audio data includes determining whether or not the wireless communication state relating to transmission of the captured audio data satisfies the predetermined condition according to a match rate between the first audio data transmitted and the second audio data returned by the external apparatus.

* * * * *